CONTROL CIRCUIT
Filed Aug. 13, 1947
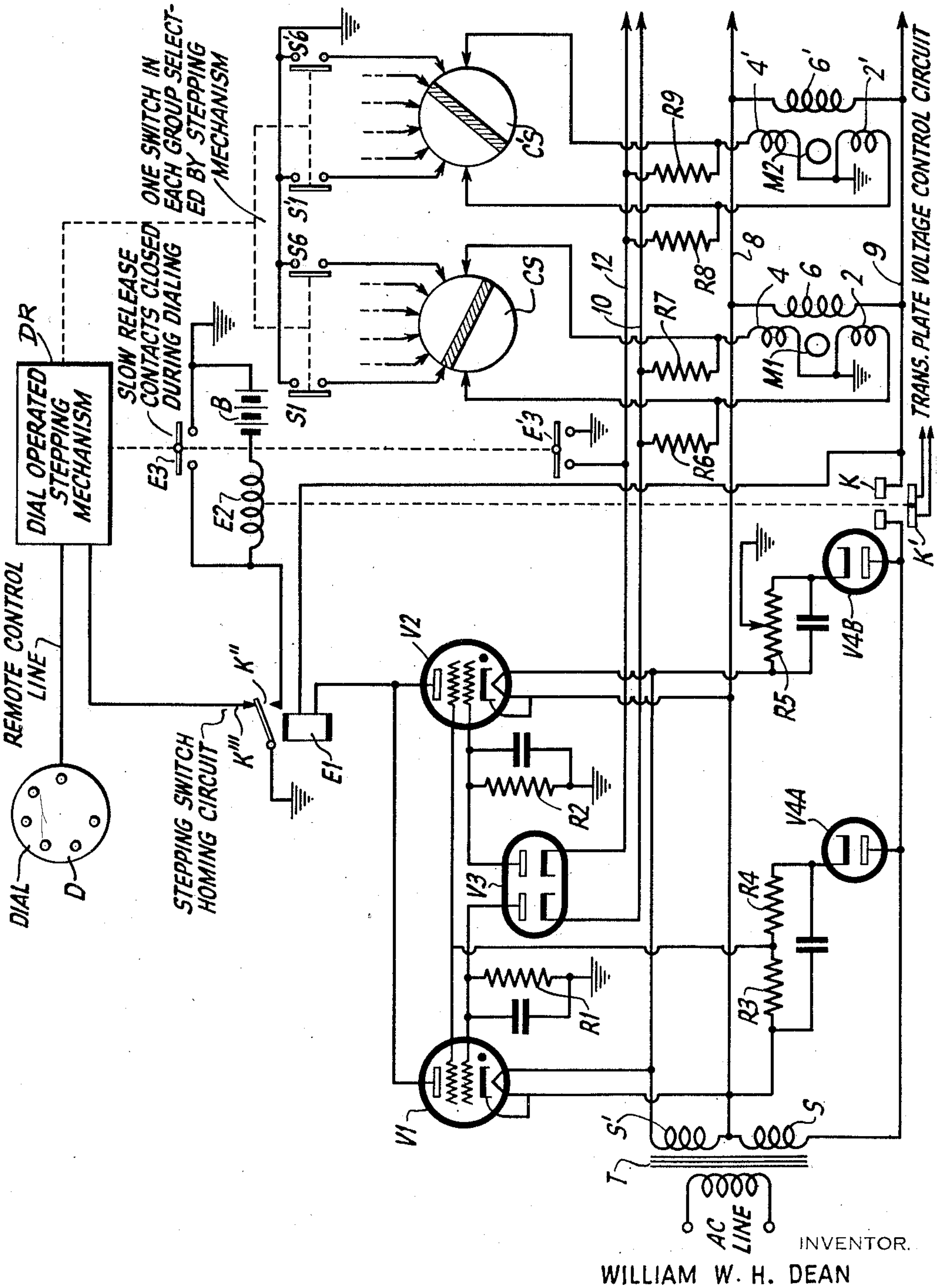
INVENTOR.
WILLIAM W. H. DEAN
BY Harry Tunick
ATTORNEY Patented Feb. 7, 1950 2,496,446

UNITED STATES PATENT OFFICE 2,496,446

CONTROL CIRCUIT

William W. H. Dean, Pointe Claire, Quebec, Canada, assignor to Radio Corporation of America, a corporation of Delaware Application August 13, 1947, Serial No. 768,318

6 Claims. (Cl. 318—445)

This application relates to radio circuits, and more particularly to circuits for tuners such as for radio transmitters, with a number of motors driving tuning reactances and the like.

The purpose of my invention is to provide a simple interlocked circuit to prevent application of plate voltage to a radio transmitter until all of a number of tuning motors complete their tuning or switching operation.

The tuning motor controls and the interlock circuits of my invention include magnetic relays and operating circuits therefor including electron discharge tubes, and a further purpose of my invention is to derive the power for running the said tubes from the power source at hand used for running the motors and transmitter.

A further purpose of my invention is to reset the control relays at the end of the tuning operation so that the apparatus will be ready for other operations and also to remove the power from the tuning motors after the tuning operation is completed.

My invention is of wide application in the radio art, but in the description which follows it has been applied to a transmitter tuning system including seven reversible motors which rotate switching or tuning elements of a radio transmitter to any one of six channels under the control of preset switches. Each motor has a field winding to which alternating current power is normally applied and two shading coils which are normally open circuited. Short circuiting one shading coil causes clockwise rotation of the motor, while short circuiting the other shading coil causes counter-clockwise rotation. In the arrangement being described the shading coils have induced therein alternating current from the field winding, and when the shading coil is open circuited about 30 volts R. M. S. appears across the coil. When such shading coil is short-circuited, there will be substantially zero induced volts across it. This open circuit voltage is made use of in accordance with my invention to operate the control circuits to attain the purposes listed above, that is, to prevent application of plate voltage to the transmitter until all tuning motors come to rest and so forth.

In describing my invention in detail, reference will be made to the attached drawings wherein the single figure illustrates by apparatus, circuit element, and connections the essential features of my improved control circuit associated with motors for tuning and the like purposes, and control apparatus for the tuning motors, including dialing means for selecting the tuning operations.

A plurality of motors M1 and M2, etc., there being seven in the apparatus used, are arranged to have their field windings 6, 6', etc., connected between leads 8 and 9 running to one of the secondary windings of a transformer T when contacts K are closed. The motors have shading windings 2 and 4, 2' and 4', etc., in which alternating currents are induced when the field windings are supplied with alternating currents. The motors are of the type which are stationary when the field windings are excited and the shading windings are open circuited. To drive the motors as desired, each motor has a commutator selector SC, S'C, etc. which has two segments and a number of brushes arranged so that when a selected brush is grounded the motor turns in such a direction that it opens the closed shading winding and brings the motor to rest. By positioning the selected brush, the commutator may be positioned anywhere over an arc of about 180°. One switch S1 or S2, etc., and S'1 or S'2, etc., in each group is closed by dial operated relays in DR acting on stepping mechanism therein as selected at the dial D which might be located at a remote point. The contacts S1, etc. S'1, etc. as selected each complete a circuit through one or the other shading coil of a motor so that if the motor field windings are excited, the motors rotate in the selected direction until the split commutator opens the selected shading winding circuit to thereby bring said motor to rest. The dial D also operates a relay which with its switch is designated E3 to close a circuit through a relay E2 and a source of potential B to operate and close contacts K so that the moment dialing starts, alternating current is supplied from transformer T through secondary winding S to the field windings so that the said windings are energized by alternating current. When contacts K are closed, alternating current is also applied to the anodes of the tubes V1 and V2. The relay E3, when it is operated, closes E'3 to ground one of the buses (here 12) to reduce the negative bias provided as described hereinafter on the grid of the rectifier V2 to fire the same. When current flows through tube V2, relay winding E1 is energized from winding S through an obvious circuit, closing contact K'' to ground to establish a holding circuit for relay winding E2 as long as winding E1 is energized, so that if E3 should accidentally open E2 will still be energized. As is usual in circuits of this type, none of the switches S1, S2, etc. is selected until after the dialing is first commenced. The relay E3 also opens a heretofore closed contact K' in the transmitter plate voltage supply circuit to remove voltage from the transmitter immediately when the dialing and circuit changing and tuning operation starts.

When the shading windings 2, 4, 2′, 4′ etc. are all open circuited and when contacts K are closed by the beginning of dialing, a potential is placed on the buses 10 and 12 to operate the electron discharge tube system in the following manner: The normally open end of each shading winding is connected through a resistor R6, R7, R8, etc. to one of two buses 10 and 12. In the arrangement being described one bus, say 10, has eight such leads thereto, being connected to the shading windings of four motors. The other bus 12 has six leads connected thereto, being connected to the shading windings of three motors. The motor shading coils are all phased in such a manner that each contributes in phase voltage to the bus to which it is connected, each shading coil having alternating voltage induced therein from its corresponding field winding when contacts K are closed. The buses 10 and 12 are connected to the cathodes of a pair of diodes in a rectifier tube V3. The rectifiers V3 are in A.-C. circuits across the voltage provided by the shading winding, when the switches S1 and/or S2, etc. are open, and in direct current rectifier circuits including resistors R1 and R6, etc. R2 and R8 etc. These resistors are in the biasing circuits of the control grids of the thyratrons V1 and V2. The anodes of the rectifiers are at the grid ends of R1 and R2 and the potentials developed there by the voltages of the shading windings are negative relative to the common point of the shading coils or ground. When all switches S1, S2, etc. are open, which is the case during dialing or when the same number is redialed, the negative potential on the control grids of tubes V1 and V2 is sufficient to bias the same to cut-off. Now, if one shading coil is short circuited by closing a switch S1 or S2 or S3, etc., the bus 10 or 12 voltage will decrease by one eighth or one sixth, respectively, due to the voltage divider action resulting from the number of resistors R6, R7, R8 and R9 in grounded circuits. When one shading coil is short-circuited by closure of one of the switches S1, S2, etc., the voltage induced therein from its corresponding field winding 6, 6′, etc., is of course no longer effective on bus 10 or 12. With more than one shading winding short circuited, the bus voltage is reduced still more. This decrease in A.-C. voltage acting through the rectifier V3 is sufficient to lower the negative bias on the thyratron grids and put the thyratron control circuit into operation.

The thyratrons V1 and V2 have their anodes tied together and connected in parallel through a standard slow release telephone type relay E1 whose winding connects the anodes of tubes V1 and V2 to the main power supply line, contacts K placing these tubes across the secondary winding S of transformer T when the contacts K are closed. The purpose of the relay E1 is to close a holding circuit through source B and relay winding E2 when the relay winding E1 is energized to close the contacts K″. When the A.-C. is applied to the anodes of tubes V1 and V2 by closing contact K, switches S1, or S2, etc. or several thereof are closed after dialing is completed to short circuit one or more shading windings and to lower the grid potential on the tubes V1 or V2, either or both tubes acting as half wave rectifiers to supply half wave current pulses through the relay winding E1 to energize the same.

A slightly negative shield bias is obtained from rectifier tube V4A which is in an alternating current circuit including winding S and in a direct current circuit including resistors R3 and R4, the adjacent terminals of which are connected to the shielding grids of tubes V1 and V2. The ratio of R3 to R4 is chosen to give the required negative potential, lead 8 being grounded. Grid bias voltage for the control grids of tubes V1 and V2 is also provided by rectifier V4B which is in an alternating current circuit including windings S and S′ in series and a direct current rectifier circuit including windings S and S′ and resistor R5 a portion of which is also between the grids and cathodes of tubes V1 and V2. Here it is noted that the cathode end of the rectifier V4B is connected to the cathodes of the tubes V1 and V2 and to the 6.3 volts filament winding S′, while the grids are connected through resistors R1 and R2 to ground and thence to a point on R5 so that an adjustable amount of direct voltage and a fixed amount of alternating voltage is supplied to the grids of tubes V1 and V2. The additional alternating voltage on the grids is out of phase with the plate voltage and is desirable to obtain the proper sensitivity when using an A.-C. plate supply for these thyratrons and to compensate for power supply variations. The direct current bias as provided is positive and is adjusted to a value which will overcome the negative voltage supplied by rectifiers V3 from buses 10 and 12 when any one shading coil is short circuited and so cause V1 and/or V2 to conduct as described previously.

The shading coil voltage is rectified and applied as peak direct current because of the harmonic content present in the alternating current. This harmonic content is sufficient to prevent it being balanced out by means of alternating current bias only.

The operation of the circuit is as follows:

Assume a new channel or frequency is to be selected by dailing. The instant the dial D is operated, a circuit for relay E3 is closed. This closes the excitation circuit for relay E2 and also grounds one of the buses, say bus 12 at switch E′3. This energizes the entire interlock system immediately due to conduction in tube V2, allowing time for removal of plate voltage, before any tuning operations are started. It should be noted that grounding bus 12 has no effect on the shading coils connected thereto due to the high value at the isolating resistors R8, R9, etc.

When the circuit for relay E2 is completed, relay E2 operates to immediately open switch K′ and remove plate voltage from the transmitter, not shown. This operation also closes contacts K and applies alternating voltage to the field windings 6, 6′, etc., to bias tubes V1 and V2 negatively, by means of the shading windings, and also applies alternating current as plate voltage to the anodes of the thyratrons V1 and V2. With E′3 closed, the thyratron V2 fires immediately to excite relay E1. K‴ is opened by E1 to break the stepping switch homing circuit. The dialing is then continued and operates through stepping relays in DR to close and ground the pre-set motor control circuit switches S1 or S2, etc. The slow release contacts of relay E3 open, but the short circuits on one or more of the shading windings 2, 2′, 4, 4′, etc. lower the negative potential provided by the rectifiers V3 on the grids of tubes V1 and V2, so that the thyratrons now having alternating current on their anodes and less negative bias on their control grids remain fired, and rectified alternating current continues to flow in their anode circuits to energize the winding of relay E1 and maintain the contacts at K'' closed to complete a holding circuit for the winding of relay E2. This locks relay E2 in a position such that contacts K are closed and remain closed until the contacts at K'' open. The contact of relay E3 opens after a short delay when the dialing has been completed but, as stated above, relay E2 is still energized by its holding circuit through contacts K'' by energization of E1 so that plate voltage cannot be applied at K'.

The motors are of the type that are stationary when currents in the two shading windings are equal or zero. Since one or more shading windings have been short circuited, depending upon the dialing these motors now rotate and continue to do so until they reach pre-selected positions, thus opening their respective control circuits at S1, S2, etc. When the last circuit has opened, both thyratrons are de-energized or quenched. This quenching results from the fact that since the shading winding circuits are all opened at S1, S2 and so forth, more alternating current is supplied to the rectifiers V3 by the induced voltage in the shading windings, contacts K still being closed, and higher negative potentials are applied to the control grids of the thyratrons V1, V2 to cut the same off. Tubes V1 and V2 are cut off because they have alternating voltage on their anodes. Cut-off of tubes V1 and V2 deenergizes winding E1, opening contacts K'' and deenergizing relay E2 to open contacts K and close contacts K'. The circuit between the alternating current source and the motor field windings is broken at K to de-energize the motor supply circuits. A back contact K''' on relay E1 also closes the homing circuits on the stepping switches, thus resetting them or returning them to zero position for the next operation.

What is claimed is:

1. In combination, an electric motor having a field winding and a plurality of shading windings inductively coupled thereto, a source of alternating current, relay-controlled means connecting said field winding to said source, means for short-circuiting a selected shading winding of said motor to operate the same when said field winding is connected to said source, means including a voltage source for causing energization of said relay, a controllable holding circuit including said voltage source for maintaining said relay energized, an electron discharge device of controllable conductivity, means responsive to the flow of current through said device for controlling said holding circuit, a control circuit excited by the alternating voltage induced in the shading windings from the field winding for producing a control potential, and means for applying said potential to an electrode of said device to control its conductivity.

2. In combination, a plurality of electric motors each having a field winding and a plurality of shading windings inductively coupled thereto, a source of alternating current, relay-controlled means connecting said field windings to said source, means for short-circuiting a selected shading winding of one or more of said motors to operate the same when said field windings are connected to said source, means including a voltage source for causing energization of said relay, a controllable holding circuit including said voltage source for maintaining said relay energized, an electron discharge device of controllable conductivity, means responsive to the flow of current through said device for controlling said holding circuit, a control circuit excited by the alternating voltages induced in the shading windings from the corresponding field windings for producing a control potential, and means for applying said potential to an electrode of said device to control its conductivity.

3. In combination, a plurality of electric motors each having a field winding and a plurality of shading windings inductively coupled thereto, a source of alternating current, relay-controlled means connecting said field windings to said source, means for short-circuiting a selected shading winding of one or more of said motors to operate the same, in a direction determined by which shading winding is short-circuited, when said field windings are connected to said source, means associated with each motor for opening the short-circuit on its shading winding when the corresponding motor has rotated through a selected angle, means including a voltage source for causing energization of said relay, a controllable holding circuit including said voltage source for maintaining said relay energized, an electron discharge device of controllable conductivity, means responsive to the flow of current through said device for controlling said holding circuit, a rectifier circuit supplied by the alternating voltages induced in the shading windings from the corresponding field windings for producing a control potential of a magnitude which depends on the number of shading windings which are short-circuited, and means for applying said potential from said rectifier circuit to said device to control the conductivity thereof in accordance with the magnitude of said control potential.

4. A control system for radio apparatus, comprising a plurality of electric motors for operating said apparatus, each motor having a field winding and a plurality of shading windings inductively coupled thereto, a source of alternating current, means connecting said field windings to said source through a pair of normally open relay contacts, a high voltage control circuit, including a pair of normally closed relay contacts, for said apparatus, means for short-circuiting a selected shading winding of one or more of said motors to operate the same when said normally open contacts are closed, a relay operated by said last-named means for opening said normally closed contacts and closing said normally open contacts, an electron discharge tube of controllable conductivity connected across said source through said normally open contacts, a biasing circuit connected to the control grid of said tube, said biasing circuit being connected to said shading windings to be excited by the voltages induced therein from the corresponding field windings when said normally open contacts are closed, and a holding circuit for said relay including its energizing source and a relay whose energizing winding is connected in series in the anode-cathode circuit of said tube.

5. A control system for radio apparatus, comprising a plurality of electric motors for operating said apparatus, each motor having a field winding and a plurality of shading windings inductively coupled thereto, a source of alternating current, means connecting said field windings to said source through a pair of normally open relay contacts, a high voltage control circuit, including a pair of normally closed relay contacts, for said apparatus, dialing means for closing pre-selected switches to short-circuit a selected shading winding of one or more of said motors to operate the same when said normally open contacts are closed, apparatus actuated by said motors for opening the circuit controlled by said switches when the motors have completed operation, a relay having an energizing circuit which is closed by operation of said dialing means to thereby open said normally closed contacts and close said normally open contacts, an electron discharge tube of controllable conductivity connected across said source through said normally open contacts, a rectifier connected to the control grid of said tube, said rectifier being connected to said shading windings to be excited by the voltages induced therein from the corresponding field windings when said normally open contacts are closed, said rectifier applying a cut-off bias to said grid when said shading windings are all open-circuited, and a holding circuit for said relay including its energizing source and a relay whose energizing winding is connected in series in the anode-cathode circuit of said tube.

6. A control system for radio apparatus comprising a plurality of electric motors for tuning said apparatus, each motor having a field winding and a plurality of shading windings inductively coupled thereto, a source of alternating current, means connecting said field windings to said source through a pair of normally open relay contacts, a high voltage control circuit, including a pair of normally closed relay contacts, for said apparatus, means for short-circuiting a selected shading winding of one or more of said motors to operate the same to tune said apparatus when said normally open contacts are closed, a relay operated by said last-named means for opening said normally closed contacts and closing said normally open contacts, a pair of electron discharge tubes of controllable conductivity each connected across said source through said normally open contacts, a rectifier connected to the control grids of said tubes, said rectifier being connected to said shading windings to be excited by the voltages induced therein from the corresponding field windings when said normally open contacts are closed, said rectifier applying a cut-off bias to said grids when said shading windings are all open-circuited, and a holding circuit for said relay including its energizing source and a relay whose energizing winding is connected in series in the anode-cathode circuit of both said tubes.

WILLIAM W. H. DEAN.

REFERENCES CITED

The following references are of record in the file of this patent:

UNITED STATES PATENTS

| Number | Name | Date |
| --- | --- | --- |
| 1,934,493 | Gehy | Nov. 7, 1933 |
| 2,307,329 | McDonald | Jan. 5, 1943 |